F. TANNER.
MEANS FOR THE PREVENTION OF RACING OF MARINE ENGINES.
APPLICATION FILED JUNE 1, 1911.

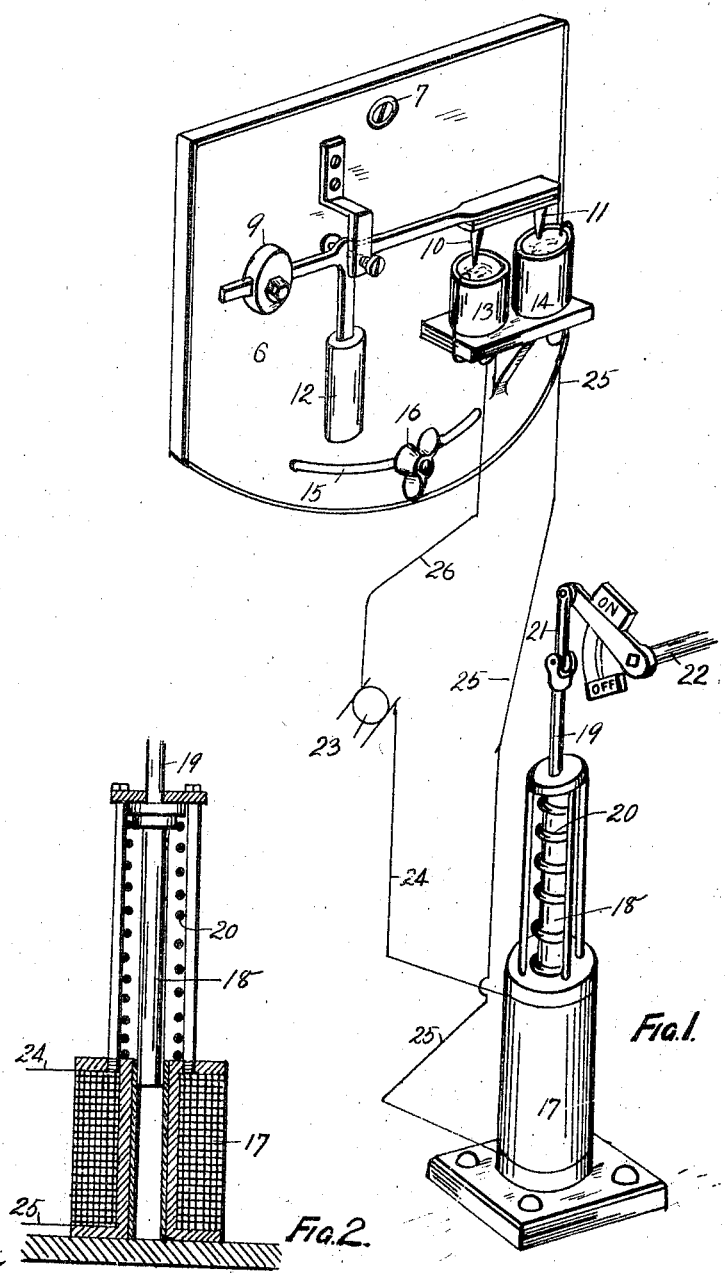

1,038,460.

Patented Sept. 10, 1912.

2 SHEETS—SHEET 2.

UNITED STATES PATENT OFFICE.

FELIX TANNER, OF SYDNEY, NEW SOUTH WALES, AUSTRALIA.

MEANS FOR THE PREVENTION OF RACING OF MARINE ENGINES.

1,038,460.

Specification of Letters Patent. Patented Sept. 10, 1912.

Application filed June 1, 1911. Serial No. 630,653.

*To all whom it may concern:*

Be it known that I, FELIX TANNER, a subject of the King of Great Britain, residing at the Hotel Arcadia, Pitt street, Sydney, in the State of New South Wales, Commonwealth of Australia, have invented certain new and useful Improvements in Means for the Prevention of Racing of Marine Engines, of which the following is a specification.

This invention relates to improvements in means for the prevention of racing of marine engines due to pitching of the vessel, my object being to provide reliable and inexpensive apparatus for that purpose.

According to my invention in a suitable position on the vessel a beam is pivoted so that in its normal position it is approximately parallel with the actual load line. On one arm of the beam is an adjustable weight for regulating purposes, and on the opposite arm are one or more depending contact pieces which are capable of taking into one or more cups or receptacles containing mercury to make contact therewith and energize a solenoid. The beam has a second adjustable weight below its pivot to maintain it as near as practicable to the horizontal position when the vessel is pitching. The solenoid has its plunger or rod extended and on the extension a link is pivoted the other end being secured to a lever controlling the spindle of the throttle valve. The effect of this is that on the vessel pitching the contact piece or pieces on the beam make electrical contact with the mercury and cause the solenoid to be energized attracting its rod and thereby actuating the link to close the throttle valve. Instead of transmitting the movement of the rod to the spindle by a link I may employ other means such as a rack and pinion. The rod is provided with a suitable spring so that immediately the contact piece or pieces on the beam break contact with the mercury the rod is retracted to its normal position and the throttle valve opened. But in order that my invention may be clearly understood, I now refer to the drawings herewith, in which:—

Figure 3:
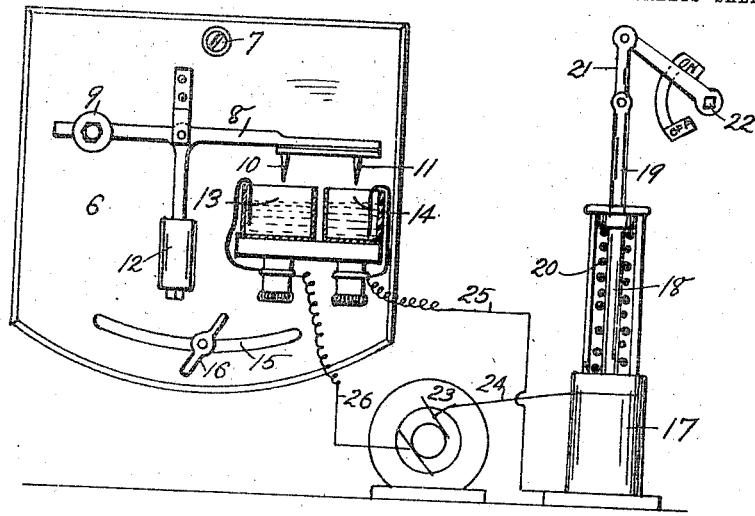
Figure 4:
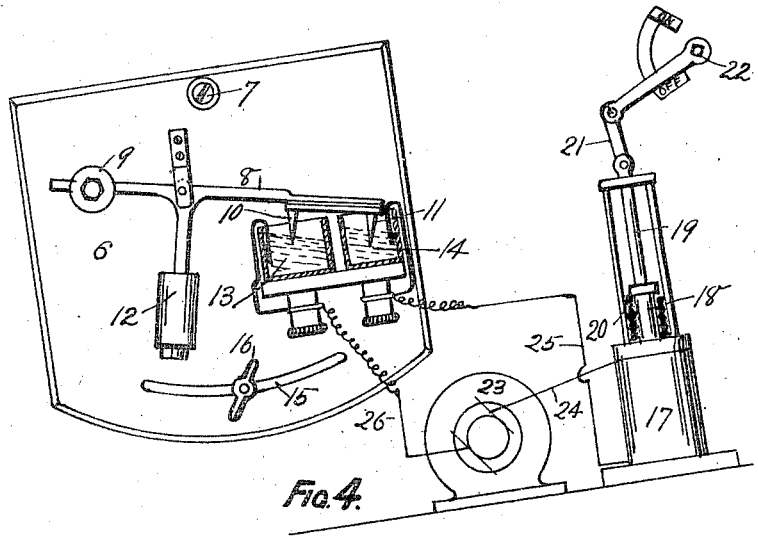

Figure 1 is a view in perspective of the apparatus. Fig. 2 is a sectional elevation of the solenoid, while, Figs. 3 and 4 are two diagrammatic views showing the "off" and "on" position of the apparatus.

The same reference numerals indicate the same or corresponding parts.

6 is a board or plate pivoted at 7 to a suitable partition in the ship.

8 is a pivoted beam having on one end the adjustable weight 9 and on the other the contact pieces 10 and 11 which are insulated from the beam by a strip of rubber or the like.

12 represents a weight also adjustable situated below the pivot of the beam 8 on a downward extension of said beam.

13 and 14 represent two receptacles of glass or the like containing mercury secured by a bracket to the board 6 and into which receptacles the contacts 10 and 11 respectively are capable of entering to make electrical contact with the mercury therein.

15 is a slot in the board and 16 is a butterfly or other nut for adjusting the position of the board on the pivot 7 relatively to the vessel.

17 represents a solenoid having a rod 18 and extension thereof 19. 20 is a spring tending to draw said rod up to its normal position.

21 is a link pivoted to the end of the extension 18 and secured also to a lever controlling the spindle 22 of the throttle valve.

23 is a dynamo and 24 wire from dynamo to solenoid and 25 wire from solenoid to mercury cup 14.

26 is the return wire from the receptacle 13 to the dynamo.

It will be evident that on the vessel pitching head down the beam will remain practically in the same horizontal line but the mercury vessels 13 and 14 will rise with the vessel permitting the mercury to contact with the pieces 10 and 11. On contact taking place the solenoid 17 will be energized to attract its rod 18 and thereby actuate the link 21 to operate the valve spindle 22 through a suitable lever. As soon as the vessel rises to the horizontal or normal position the contacts will be broken thereby cutting off the current from the solenoid and allowing the spring to draw up the rod 18 and throw the valve spindle to the "on" position.

If need be a magnet or magnets may be fixed on or adjacent to the contact pieces for the purpose of eliminating excessive sparking. I may also place oil on the top of the mercury for the same purpose.

Having thus described my invention what I claim as new and desire to protect by Letters Patent is:—

Means for preventing racing of marine engines, comprising a plate pivotally mounted for adjustment in the direction of the longitudinal plane of the vessel, a beam pivotally mounted on the plane and adapted to occupy a normal horizontal position in the longitudinal plane of the vessel, the beam being provided at one end thereof with contact means, and at the other end thereof with an axial weighting extension, the beam also having a weighted extension projecting downward from its pivotal connection, relatively fixed contact means mounted on the plate for coöperation with the contact means on the beam, the plate, the beam, and the relatively fixed contact means being assembled as a unit, an electric circuit including the fixed contact means, a throttle valve, and a solenoid included in said circuit and mechanically connected to the throttle valve.

In testimony whereof I have hereunto set my hand in presence of two subscribing witnesses.

FELIX TANNER.

Witnesses:
 CHARLES E. ERAHAM,
 HENRY W. CLARKE.